United States Patent
Farooq et al.

(10) Patent No.: US 8,950,800 B1
(45) Date of Patent: Feb. 10, 2015

(54) DEPLOYABLE LOWER LEG STIFFENER FOR PEDESTRIAN PROTECTION

(71) Applicant: Ford Global Technologies, LLC, Dearborn, MI (US)

(72) Inventors: Iskander Farooq, Novi, MI (US); Mohammed Omar Faruque, Ann Arbor, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/076,325

(22) Filed: Nov. 11, 2013

(51) Int. Cl.
*B60R 21/34* (2011.01)
*B60R 19/56* (2006.01)

(52) U.S. Cl.
CPC ........................................ *B60R 19/56* (2013.01)
USPC ....................... 296/187.04; 293/118; 293/119

(58) Field of Classification Search
CPC ....................................................... B60R 21/34
USPC ............ 296/187.04; 293/24, 25, 26, 118, 119
See application file for complete search history.

(56) References Cited

U.S. PATENT DOCUMENTS

| 3,992,047 | A | 11/1976 | Barenyi et al. |
| 4,514,002 | A | 4/1985 | McIntosh |
| 4,582,351 | A | 4/1986 | Edwards |
| 4,904,016 | A | 2/1990 | Tatsumi et al. |
| 6,089,628 | A * | 7/2000 | Schuster ........................ 293/118 |
| 6,394,512 | B1 | 5/2002 | Schuster et al. |
| 6,460,909 | B2 | 10/2002 | Mansoor et al. |
| 6,513,843 | B1 | 2/2003 | Frederick et al. |
| 6,637,788 | B1 | 10/2003 | Zollner et al. |
| 6,726,260 | B1 | 4/2004 | Wang et al. |
| 6,773,044 | B2 | 8/2004 | Schambre et al. |
| 6,834,898 | B2 | 12/2004 | Wang et al. |
| 6,834,899 | B2 * | 12/2004 | Lindsey ........................ 293/118 |
| 6,886,883 | B2 | 5/2005 | Jacquemard et al. |
| 7,192,079 | B2 | 3/2007 | Schramm et al. |
| 7,201,414 | B2 * | 4/2007 | Iketo et al. ..................... 293/133 |
| 7,530,612 | B2 | 5/2009 | Regnell et al. |
| 2002/0180224 | A1 | 12/2002 | Mansoor et al. |
| 2008/0157547 | A1 * | 7/2008 | Baumann et al. ............. 293/118 |

FOREIGN PATENT DOCUMENTS

| FR | 2864811 A1 | 7/2005 |
| GB | 2069940 A | 9/1981 |
| GB | 2384215 A | 7/2003 |

* cited by examiner

*Primary Examiner* — Jason S Morrow
(74) *Attorney, Agent, or Firm* — Raymond L. Coppiellie; Brooks Kushman P.C.

(57) ABSTRACT

A deployable pedestrian protection lower leg stiffen apparatus includes a left and a right linear actuator mountable adjacent to respective left and right forward frame members of a vehicle and a lower leg stiffener attached to and movable by the actuators. The actuators are extendable along respective deployment axes extending forward and downward relative to the vehicle to move the stiffener between a retracted position rearward of a forward surface of a front bumper beam and above a ground clearance plane and a deployed position forward of the retracted position and below the ground clearance plane. The actuators have rotational joints defining a horizontal pivot axis about which at least the forward portions of the piston may rotate upward along with the stiffener to prevent damage to the system if it strikes a road obstacle.

20 Claims, 4 Drawing Sheets

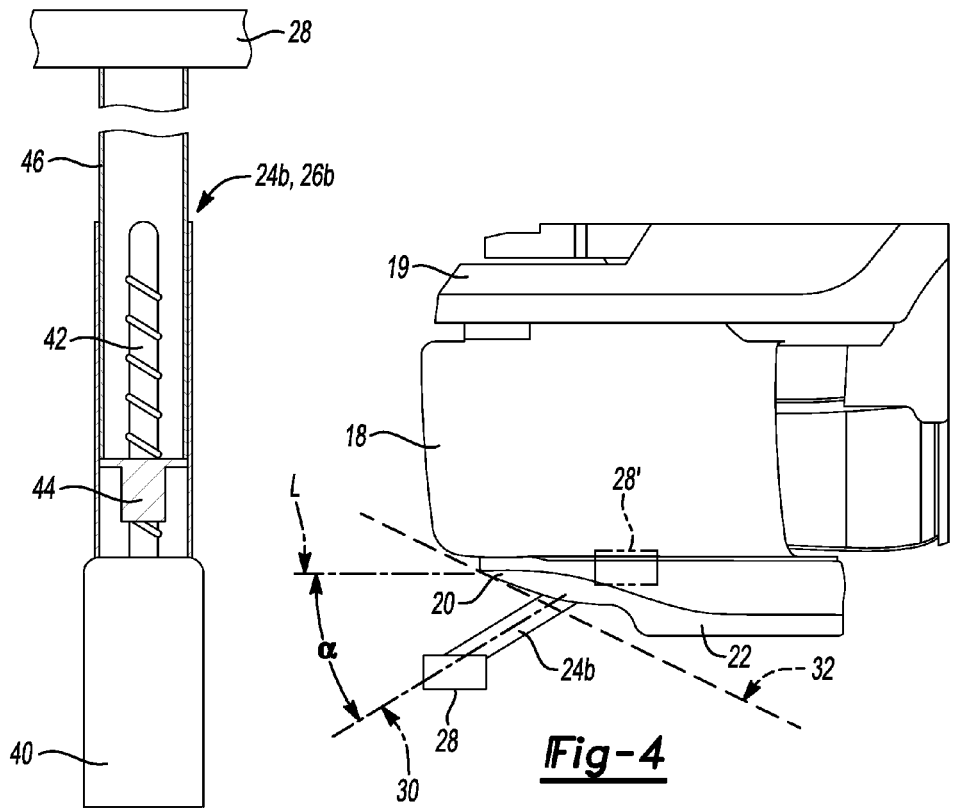
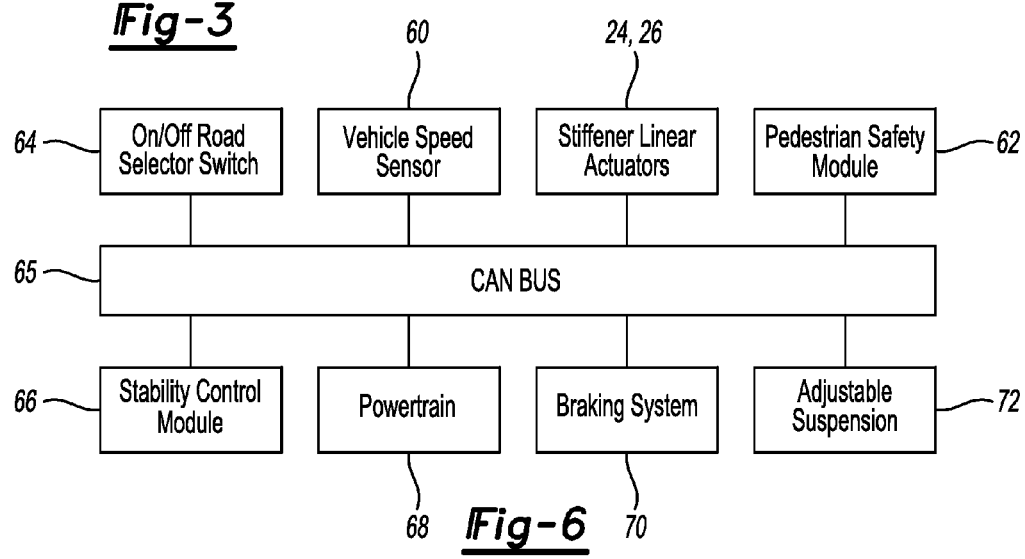

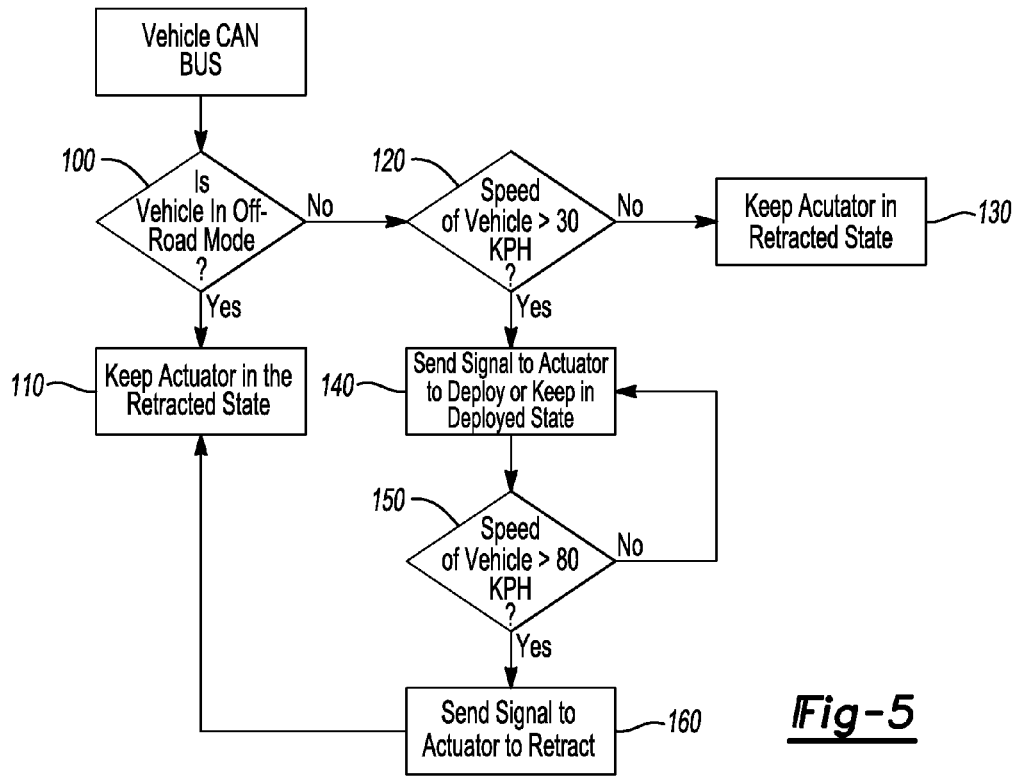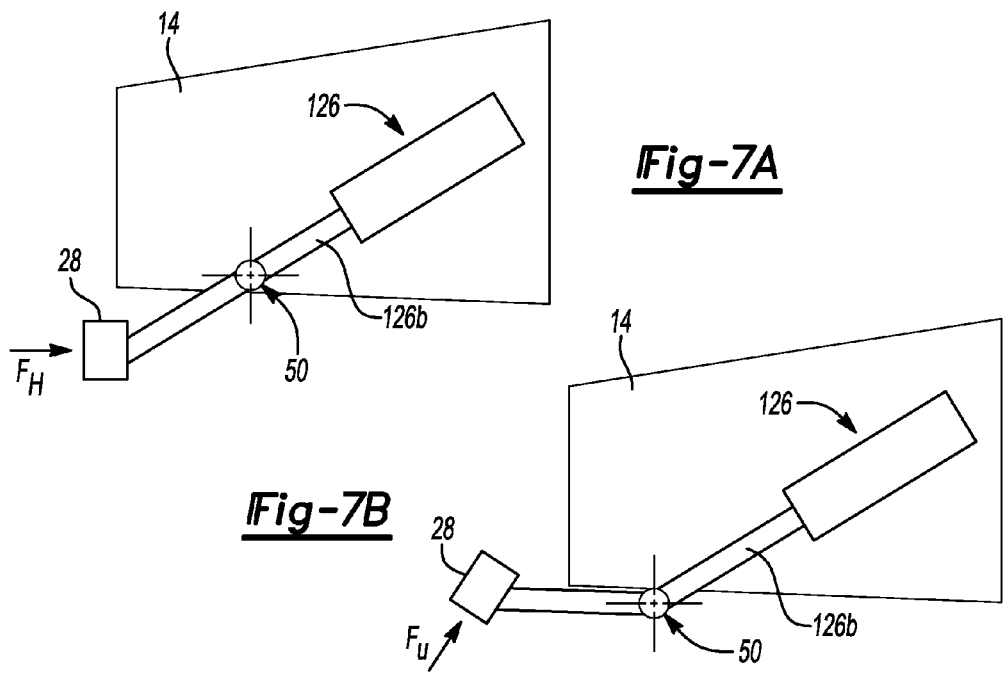

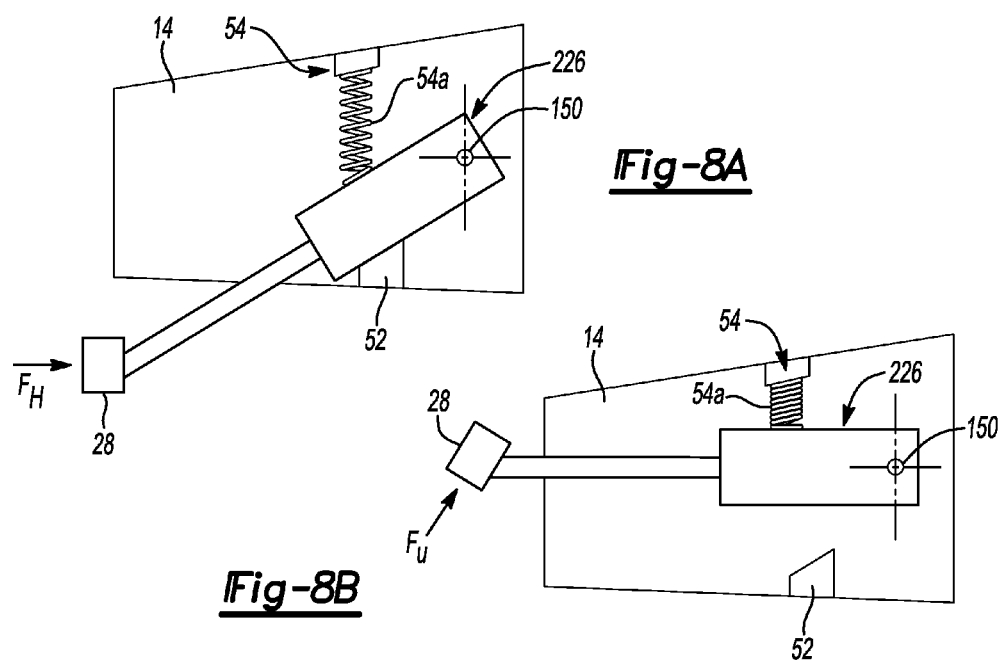

DEPLOYABLE LOWER LEG STIFFENER FOR PEDESTRIAN PROTECTION

TECHNICAL FIELD

The present invention relates generally to front bumper systems for motor vehicles, and more specifically, to a pedestrian protection stiffener deployable below the bumper system.

BACKGROUND

Most current motor vehicles include a front bumper system intended to resist and/or absorb impact loads in the event of a collision. Typically, the bumper system includes a rigid bumper beam extending transversely relative to the vehicle and having sufficient strength to resist a required level of impact energy. The bumper beam is mounted to and supported by the vehicle frame, sub-frame, and/or body structure. In some cases, the bumper beam is mounted to the forward ends of a pair of frame rails which extend longitudinally relative to the vehicle and are spaced apart transversely. Often, the forward-most portion of the forward frame, immediately behind the bumper beam, comprises crush cans which are engineered to deform or collapse longitudinally in a manner to absorb impact energy in a predictable manner. The bumper system may also include numerous other bumper members and/or trim members connected to the bumper beam and/or the forward frame members. Bumper systems may also include one or more fascia components exposed over and covering the bumper.

Several current national and multi-national vehicle safety regulatory bodies have formulated pedestrian safety standards which new vehicles will be measured against. At least one such pedestrian safety test attempts to measure or estimate the degree of injury that will be inflicted on the lower leg of standing or walking pedestrian if struck by a relatively slow-moving vehicle. These tests generally indicate that a greater vertical distance between the bumper and the road surface may result in greater injury to the pedestrian's lower leg, because the lower leg may slide underneath the bumper.

Simply lowering the height of the bumper in order to improve performance in such a test may not be a practical solution because of the resulting reduction in vehicle ground clearance. Having a relatively large ground clearance is particularly important for vehicles that must operate off of paved surfaces.

It is known to provide a so-called lower leg stiffener below the bumper which is intended to prevent the bumper from over-riding the pedestrian's lower leg, and therefore reduce the likelihood and/or the severity of injury during a pedestrian impact. If the stiffener is fixed it may be damaged if it strikes an obstacle in the vehicle's path.

SUMMARY

In a first disclosed embodiment, pedestrian safety apparatus comprises a left and a right linear actuator mountable adjacent to respective left and right forward frame members of a vehicle and a lower leg stiffener attached to and movable by the actuators. The actuators are extendable along respective deployment axes extending forward and downward relative to the vehicle to move the stiffener between a retracted position rearward of a forward surface of a front bumper beam and above a ground clearance plane and a deployed position forward of the retracted position and below the ground clearance plane.

In a further feature, the actuators are mountable alongside inboard surfaces of the respective forward frame members.

In a further feature, a rotational joint is associated with at least one of the actuators to define a pivot axis rearward of the stiffener. The stiffener and at least a forward portion of the actuator attached to the stiffener are rotatable upward about the pivot axis. If an upward force is applied to the stiffener, for example due to striking an obstacle on the road surface, the stiffener is thus able to move upward to prevent damage.

In a further embodiment, pedestrian safety apparatus comprises a linear actuator mounted adjacent to a forward frame member of a motor vehicle and rearward of a bumper beam supported by the forward frame member. The actuator has a piston extendable along a deployment axis extending forward and downward relative to the vehicle. A lower leg stiffener is mounted to the piston for movement therewith between a) a retracted position rearward of a forward surface of the bumper beam and above a ground clearance plane of the vehicle, and b) a deployed position forward of the retracted position and below the ground clearance plane.

BRIEF DESCRIPTION OF THE DRAWINGS

FIG. 3 is a schematic view of a linear actuator for deploying a pedestrian protection leg stiffener;

FIG. 4 is a schematic side view of showing a pedestrian protection leg stiffener in a deployed position;

FIG. 5 is a flow-chart showing an example of a speed-based deployment logic for a leg stiffener system;

FIG. 6 is a system block diagram of a control system to control the stiffener position;

FIGS. 7A and 7b are schematic side views showing a leg spoiler actuator with a rotational joint; and FIGS. 8A and 8b are schematic side views showing an alternative rotational mounting for a leg spoiler actuator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
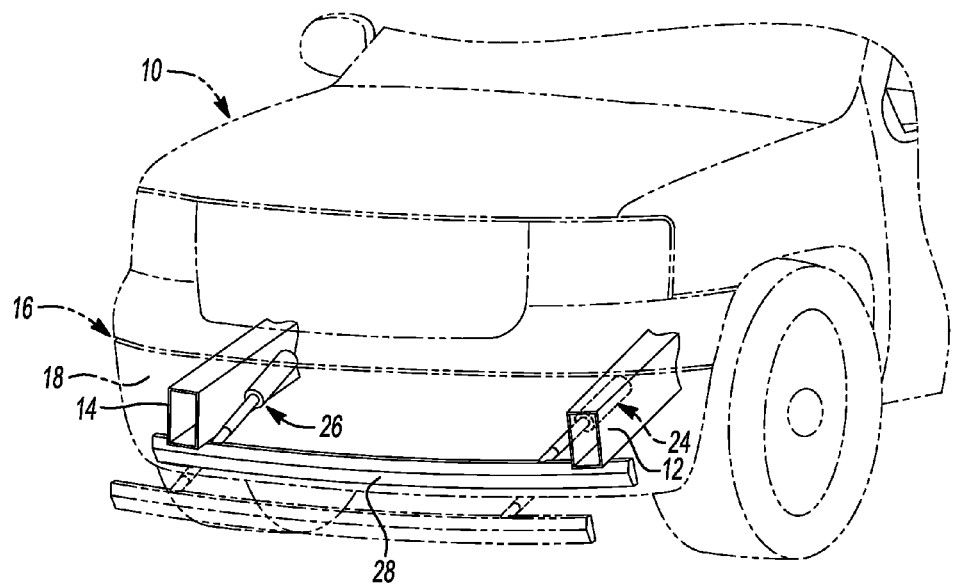
FIG. 1 is a schematic perspective view of a vehicle equipped with a pedestrian protection leg stiffener.
Figure 2:
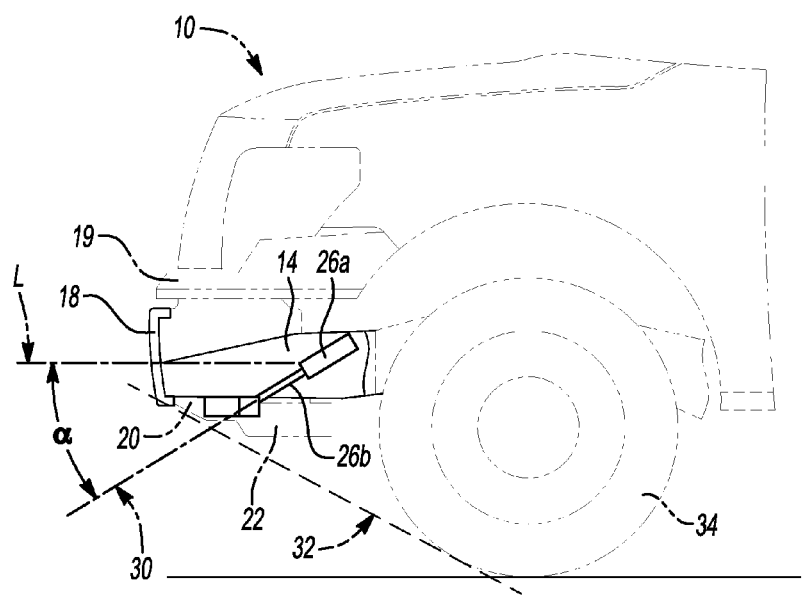
FIG. 2 is a schematic side view of the vehicle and pedestrian protection leg stiffener of FIG. 1.

Referring to FIGS. 1 and 2, a motor vehicle 10 generally comprises a left and a right forward frame member 12, 14 oriented approximately longitudinally relative to the vehicle. Forward frame members 12, 14 may be portions of a traditional ladder-type frame, of a forward vehicle sub-frame, of a unitary body/frame ("unit-body") construction, or of any known motor vehicle structure. Forward frame members 12, 14 may comprise crush cans.

A bumper assembly 16 extends generally transversely relative to the vehicle and is mounted to the left and right forward frame members 12, 14 in a conventionally known manner. Bumper assembly 16 generally comprises a rigid, high strength bumper beam 18 that is typically formed from steel, aluminum alloy, or a high-strength composite material. As is well known in the art, bumper beam 18 is a structural member designed to withstand impact loads during a collision and to transfer such loads to the forward frame member 12, 14. If the forward frame member 12, 14 comprise crush cans, an impact of sufficiently high impulse will result in the forward frame members yielding or deforming to absorb kinetic energy of the impact.

Bumper assembly 16 may further comprise one or more other components such as an upper valence 19, a lower valence 20 attached to a lower portion of the bumper beam 18 and/or an air dam 22 which may be formed integrally with the lower valance.

Left and right linear actuators 24, 26 are mounted adjacent to the inboard surfaces of forward frame members 12, 14, respectively. As best seen in FIG. 2, right linear actuator 26 generally comprises a fixed portion 26a secured to forward frame member 14 and a movable piston 26b. Right linear actuator 26 is mounted to right frame member 14 so that piston 26b is linearly extendable along a deployment axis 30 that is oriented downward and forward at an angle α relative to a line L parallel with the longitudinal axis of the vehicle. Left linear actuator 24 similarly comprises a fixed portion secured to left forward frame member 12 and a movable piston extendable along a deployment axis at angle α relative to the vehicle longitudinal axis.

A lower leg stiffener 28 is mounted to the forward or distal ends of the pistons 24b, 26b and is moveable between a retracted position and an extended or deployed position by extension of the linear actuators 24, 26. Stiffener 28 may be made of any appropriate material, such as steel, aluminum or carbon fiber composites or plastics. For example, computer-aided engineering (CAE) simulations have been carried out in which the stiffener was modeled as a 50 mm×50 mm tube cross-section with wall thickness of 1.6 mm, formed of 6111 aluminum alloy.

As best seen in FIG. 2, when in the retracted position stiffener 28 is located immediately below the forward frame members 12, 14 and rearward of the forward surface of bumper beam 18. In the retracted position, stiffener 28 is preferably located above a ground clearance plane 32. Ground clearance plane 32, as is well known in the art, is an imaginary plane normally established by drawing a straight line from a point tangent to the front tire 34 to a lowest portion of the bumper assembly 16 or any other component extending downward and/or forward from the bumper beam. Thus, ground clearance plane 32 is the inclined plane below which no portion of the vehicle structure extends. The ground clearance plane for most vehicles sold in standard-use markets usually provides for a minimum height of running clearance and minimum degrees of ramp break-over angle or approach angle clearance in front of the front tires. Because stiffener 28 is located completely above the ground clearance plane 32 when retracted, it is protected from being struck by obstacles and it does not reduce the vehicle's ground clearance.

FIG. 4 shows the actuator 24 and lower leg stiffener 28 in the deployed or extended position. Actuator 26 is not visible in this side view, but is also in an extended state. In the deployed position, the linear actuators 24, 26 have been actuated to extend pistons 26a, 26b downward and forward so that the stiffener 28 is below the bumper beam 18 and below the ground clearance plane 32. When stiffener 28 is in the deployed position, it prevents or inhibits a lower leg (not shown) of a pedestrian from becoming trapped beneath the bumper assembly of a vehicle when the vehicle strikes the pedestrian. The value of angle α at which deployment axes 30 are oriented relative to horizontal and the vertical position of the stiffener 28 between the ground surface and the bumper assembly 16 may be determined by the geometry of the particular motor vehicle type and the pedestrian protection targets that the system is intended to meet.

FIG. 4 also shows the position of the stiffener when in the retracted position, shown in hidden line and indicated by 28'. The retracted stiffener 28' may be partially enclosed and/or hidden from view by the lower valance 20 or other component(s) of bumper assembly 16. Alternatively, the retracted stiffener 28' may lie against and/or fit into a recess in the lower structure of the bumper assembly (in valence 20, for example) to present an aerodynamic shape.

Linear actuators 24, 26 may be electrically, pneumatically, or hydraulically powered. FIG. 3 is a simplified schematic diagram of one possible embodiment employing a rotary screw-type linear actuator in which a reversible electric motor 40 rotates a screw 42. A nut 44 engages the threads of screw 42 and is fixed relative to a piston shaft 46. Accordingly, rotation of screw 42 by motor 40 results in nut 44 and the attached piston 46 being extended or retracted depending on the direction of motor rotation.

In recognition of data collected relating to real-world pedestrian/vehicle collisions, pedestrian protection standards related to lower leg injury generally only address vehicle operation at relatively low speeds. For example, some standards may call for a vehicle to meet lower leg injury targets only in a speed range of from approximately 30 kph (kilometers per hour) to approximately 80 kph. Accordingly, the stiffener may be deployed only when the vehicle is operating in this speed range. Below 30 kph the stiffener is maintained in the retracted position where it is protected from damage. If the vehicle driver sees an obstacle that must be driven over and requires maximum ground clearance, he/she can slow to below 30 kph and the stiffener will be retracted. Above 80 kph, the stiffener is also retracted to reduce aerodynamics drag and to improve energy efficiency.

In addition, some vehicles may be operable in an Off-Road mode in which certain vehicle systems (suspension and/or powertrain, for example) have settings adapted for operation on un-paved, rough surfaces and, usually, at lower speeds. Such an Off-Road mode may be selected manually by the vehicle operator (if such a switch is provided for the operator) and/or may be triggered automatically based on certain detected parameters. When the vehicle is operating in an Off-road Mode, it is expected that it will be traveling in an area in which pedestrians are not likely to be present, and it is assumed that the vehicle will require the largest possible ground-clearance to avoid striking obstacles. Therefore, in the Off-Road mode, deployment of the stiffener is inhibited regardless of the vehicle speed.

FIG. 5 illustrates, in flow-chart form, an example of a speed-based deployment logic. At block 100, if a vehicle control system is in Off-Road mode, the actuators are maintained in their retracted states (block 110). If the Off-Road mode is not engaged, the logic progressed to block 120 where the vehicle speed is compared with a lower threshold speed, 30 kph in this example. If the speed is below this lower threshold speed, the actuators are maintained in their retracted states, block 130.

If the vehicle speed check at block 120 is found to exceed 30 kph, a signal triggers the actuators (block 140) to move the stiffener to the deployed position. The actuators remain in the deployed state as long as the speed remains above the lower threshold speed.

At block 150, the speed is compared with an upper threshold speed, 80 kph in this example. If the vehicle remains below 80 kph, the stiffener remains deployed. But if the speed exceeds 80 kph, the logic advances to block 160 and the actuators are retracted.

FIG. 6 shows a schematic block diagram of apparatus to control the stiffener position in accordance with speed-based logic of the general type described in relation to FIG. 5. In this example, vehicle speed data is provided by a speed sensor 60 and communicated to a pedestrian safety module 62 via, for example, an electronic data bus such as a communication area network or CAN bus 64. Pedestrian safety module 62 receives speed data from speed sensor 60 as well as inputs from an On/Off-Road Selector Switch 65, applies the programmed logic, and controls linear actuators 24, 26 accordingly. Other vehicle systems such as stability control module 66, powertrain 68, braking system 70, and adjustable suspension system 72 may also be adjusted in accordance with the On/Off-Road Selector Switch position and/or additional inputs, as is well known in the art.

FIGS. 7A and 7B schematically depict a further embodiment of the invention in which the stiffener 28 is able to move upward if it strikes an object on the road surface. In this embodiment, the linear actuator 126 (only one of which is shown, but representative of both the left and right actuators) has a piston 126b with a rotational joint 50 dividing the piston into forward and rear portions. Rotational joint 50 defines a generally horizontal pivot axis which allows the forward portion of the piston and the attached stiffener 28 to rotate upwardly from the normal, lowered position shown in FIG. 7A and a deflected condition shown in FIG. 7B. During normal operation the force applied to the stiffener 28 by striking a pedestrian's lower leg is expected to be generally horizontal, as indicated by $F_H$. But if the stiffener 28 strikes an obstacle on the road surface (a high curb, log, rock, or piece of debris, for example) which applies a force $F_u$ with an upward component the rotational joints 50 allows the stiffener to deflect or rotate upward as indicated in FIG. 7B. Upward movement of the stiffener 28 will prevent or reduce the severity of damage suffered by stiffener 28 and/or linear actuators 126. Rotational joint 50 may include a spring or other biasing device (not shown) urging the forward portion of piston 126b to the lowered position shown in FIG. 7A. Any other appropriate means of applying a force to stiffener 28 and/or the forward portion of piston 126b may be employed to bias the stiffener to the operative, lowered position shown in FIG. 7A.

FIGS. 8A and 8B show an alternative structure for reducing damage to the apparatus if the stiffener strikes an obstruction. Linear actuator 226 is mounted to frame member 14 by a rotational joint 150. A lower stop 52 is secured to the frame member 14 or other adjacent structure and contacts a lower surface of the linear actuator to prevent the actuator from rotating beyond a lower most limit. Similarly, an upper stop 54 is secured to the forward frame member 14 or adjacent structure. Upper stop 54 may comprise a biasing device, indicated schematically by 54a, to provide a downward force on linear actuator 226 to hold it against lower stop 52 in the lowered operating position. Biasing device 54a may be a spring or other mechanical or pneumatic device, and may (without departing from the scope of the invention) be located at any position in which it applies a downward rotational force on actuator 226.

As with the FIG. 7A, 7B embodiment, a pedestrian collision is expected to result in a generally horizontal force $F_H$ applied to stiffener 28 and the stiffener maintains the lowered position shown in FIG. 8A in which piston 226b is extended and the stiffener is at the desired position between the bumper assembly and road surface to prevent the bumper from over-riding the pedestrian's lower leg.

FIG. 8B shows the linear actuator 226 and stiffener 28 deflected upwardly as the result of striking an obstacle (not shown) that applies an upward force $F_u$ to the stiffener 28. Linear actuator 226 rotates upwardly (clockwise as shown in FIG. 8B) against any biasing force (if present). For example, the rotational mount 150 may include a spring element (not shown). Alternatively, the combined mass of linear actuator 226 and stiffener 28 may be sufficient to maintain the apparatus in the position shown in FIG. 8A so that no biasing element is necessary.

The disclosed positioning of linear actuators adjacent to the forward frame members and in particular mounting them alongside the inboard surfaces of the frame members along with the straight line movement of the stiffener between the retracted and the deployed positions results in a very space-efficient solution to employment of a deployable stiffener.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for a motor vehicle having left and right forward frame members supporting a bumper beam comprising:
 a left and a right linear actuator mountable adjacent to the left and right forward frame members respectively, the actuators extendable along respective deployment axes extending forward and downward relative to the vehicle; and
 a pedestrian protection stiffener mounted to the actuators for linear movement along the deployment axes by extension of the actuators between a retracted position rearward of a forward surface of the bumper beam and above a ground clearance plane and a deployed position forward of the retracted position and below the ground clearance plane.

2. The apparatus of claim 1 wherein the actuators are mountable inboard of the respective forward frame members.

3. The apparatus of claim 1 further comprising a rotational joint associated with at least one of the actuators to define a pivot axis rearward of the stiffener, the stiffener and at least a forward portion of the actuator attached to the stiffener rotatable upward about the pivot axis.

4. The apparatus of claim 3 wherein the rotational joint permits upward movement of a forward portion of the actuator relative to a rear portion of the actuator.

5. The apparatus of claim 3 wherein the rotational joint mounts the at least one linear actuator to the forward frame member.

6. The apparatus of claim 5 further comprising a biasing device urging the linear actuator to a lowered position about the pivot axis.

7. The apparatus of claim 1 wherein the forward frame members comprise left and right crush cans and the linear actuators are mountable to the respective crush cans.

8. Apparatus comprising:
 an actuator mounted to a vehicle frame and rearward of a bumper supported by the frame, and extendable along an axis forward and downward relative to the vehicle; and
 a stiffener mounted to the actuator for linear movement therewith along the axis between a retracted position rearward of a forward bumper surface and above a ground clearance plane, and a deployed position forward of the retracted position and below the ground clearance plane.

9. The apparatus of claim 8 further comprising a rotational joint associated with the actuator to define a pivot axis rearward of the stiffener, the stiffener and at least a forward portion of the actuator attached to the stiffener rotatable upward about the pivot axis.

10. The apparatus of claim 9 wherein the rotational joint permits upward movement of the forward portion of the actuator relative to a rear portion of the actuator.

11. The apparatus of claim 9 wherein the actuator is mounted to the frame member by the rotational joint.

12. The apparatus of claim 11 further comprising a biasing device urging the actuator to a lowered position about the pivot axis.

13. The apparatus of claim 8 further comprising a second actuator mounted adjacent to a second frame member of the vehicle spaced laterally from the frame member and having a second actuator extendable along a second axis parallel with the axis.

14. The apparatus of claim 13 wherein the actuators are mountable inboard of the respective frame members.

15. The apparatus of claim 13 wherein the frame members comprise left and right crush cans and the actuators are mounted to the crush cans.

16. Apparatus for a motor vehicle having left and right forward frame members supporting a bumper beam comprising:
    a left and a right linear actuator mountable to inboard surfaces of the left and right forward frame members respectively and having pistons extendable along respective mutually parallel deployment axes extending forward and downward relative to the vehicle, each of the actuators having a rotational joint defining a horizontal pivot axis about which at least a forward portion of the piston is rotatable upward; and
    a pedestrian protection stiffener mounted to the pistons and movable linearly along the deployment axes therewith between a) a retracted position rearward of a forward surface of the bumper beam and above a ground clearance plane, and b) a deployed position forward of the retracted position and below the ground clearance plane, and the stiffener further rotatable about the pivot axes along with the forward portions of the pistons.

17. The apparatus of claim 16 wherein each of the rotational joints permits upward movement of the forward portion of the piston relative to a rear portion of the piston.

18. The apparatus of claim 16 wherein the linear actuator is mounted to the forward frame by the rotational joint.

19. The apparatus of claim 18 further comprising a biasing device urging the linear actuator to a lowered position about the pivot axis.

20. The apparatus of claim 16 wherein the forward frame members comprise left and right crush cans and the linear actuators are mountable to the respective crush cans.

* * * * *